J. E. HOWARD.
BUTTER CUTTER.
APPLICATION FILED FEB. 24, 1916.
1,219,738.
Patented Mar. 20, 1917.
2 SHEETS—SHEET 1.
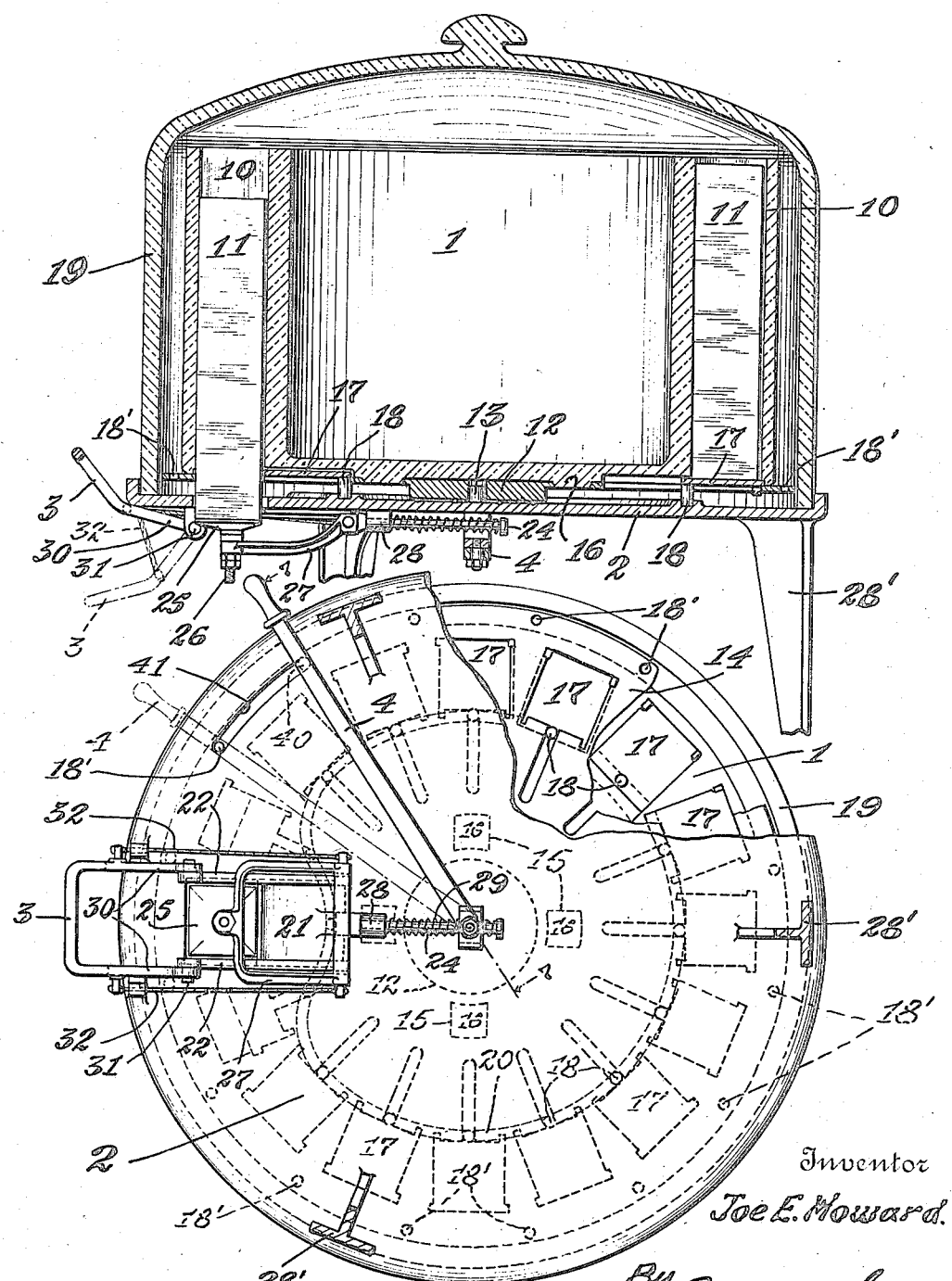
Inventor
Joe E. Howard.

J. E. HOWARD.
BUTTER CUTTER.
APPLICATION FILED FEB. 24, 1916.
1,219,738.
Patented Mar. 20, 1917.
2 SHEETS—SHEET 2.
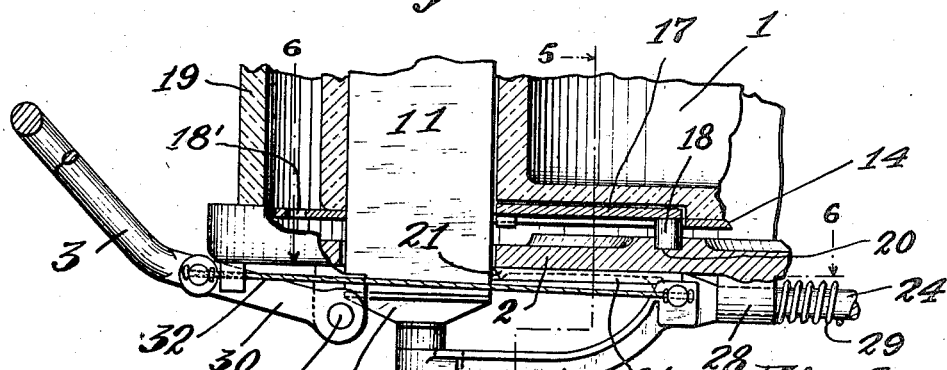
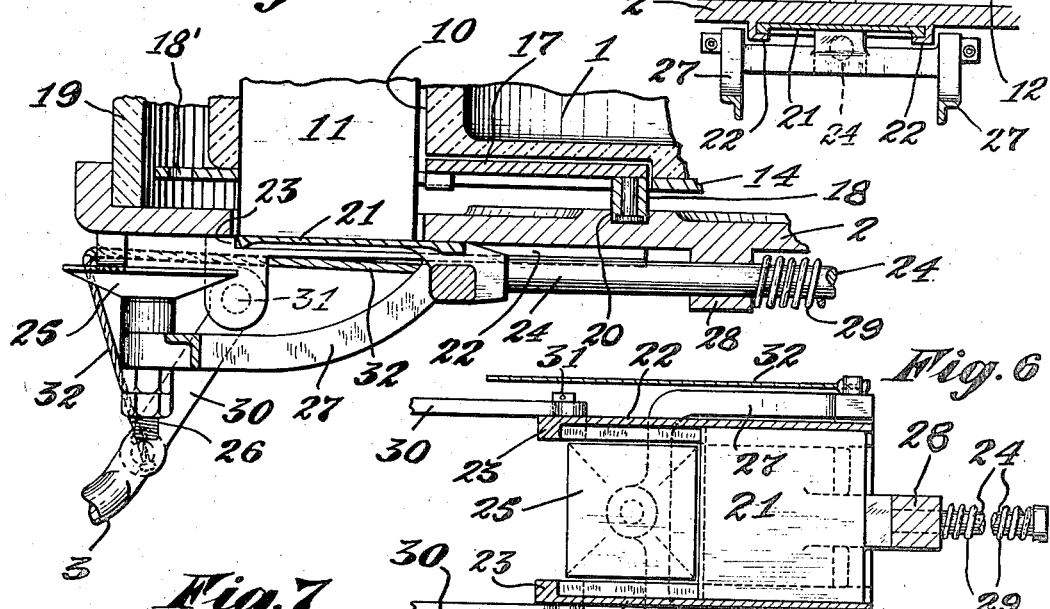
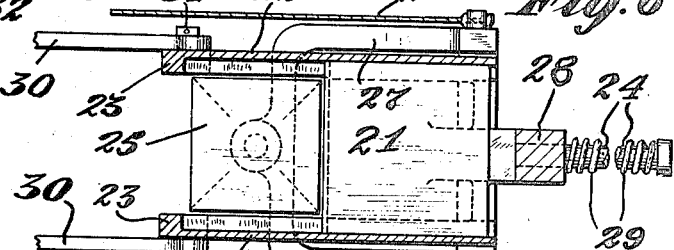
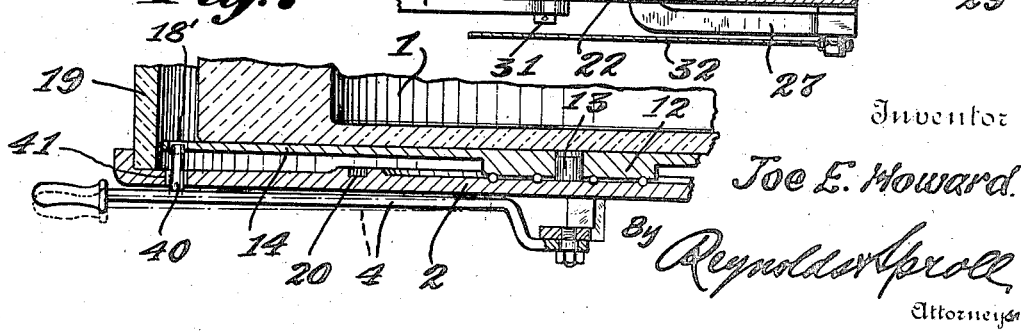
Inventor
Joe E. Howard.
By Reynolds Sproll
Attorneys

UNITED STATES PATENT OFFICE.

JOE E. HOWARD, OF SEATTLE, WASHINGTON, ASSIGNOR OF ONE-HALF TO IRENE GRANT SEYMOUR, OF SEATTLE, WASHINGTON.

BUTTER-CUTTER.

1,219,738.  Specification of Letters Patent.  Patented Mar. 20, 1917.

Application filed February 24, 1916. Serial No. 80,301.

*To all whom it may concern:*

Be it known that I, JOE E. HOWARD, a citizen of the United States, and resident of the city of Seattle, county of King, State of Washington, have invented certain new and useful Improvements in Butter-Cutters, of which the following is a specification.

My invention relates to butter cutters, and consists of an organized machine in which is placed a series of bars of butter, and which is provided with means by which these bars may be successively cut into small disks or slices.

The object of my invention is to provide a machine which will retain the butter covered where it will be absolutely sanitary, and to provide means whereby as the butter may be wanted for individual use, the butter may be cut into small slabs or disks. Other objects of my invention will appear from a study of the specification and drawings.

In the accompanying drawings I have shown my invention in the form of construction which is now most preferred by me.

Figure 1 is a vertical section through the device.

Fig. 2 is a bottom plan view with a portion of the bottom broken away at one side.

Fig. 3 is a vertical section illustrating the butter cutting mechanism.

Fig. 4 is a like view showing the parts in different position.

Fig. 5 is a section on the line 5—5 of Fig. 3.

Fig. 6 is a section on the line 6—6 of Fig. 3, and Fig 7 is a section illustrating the means by which the device as a whole is turned.

In my invention I employ a rotative member which is in the shape of a tank or receptacle, having a central chamber of considerable size adapted to receive ice, in order to keep the butter cool. This receptacle 1, has an outer wall provided with a series of vertically extending chambers 10 of a size to receive the bar of butter. These bars of butter 11 are to be cut to the size which it is desired the individual slices to be. This central member is mounted upon a disk 12, which is mounted to turn about a pivot 13.

This central member preferably extends as a plate 14 to a point slightly beyond the outer edge of the member 1. It is also provided with means, such as a series of holes 15 which receive lugs 16, projecting from the lower surface of the member 1, whereby when it is put in place upon the plate 14 it will be held in fixed and definite relation thereto. The plate 14 is provided with holes opposite each of the chambers 10, through which the bar of butter may pass.

The plate 14 is provided with slots in which are mounted a series of radially reciprocating plates 17, which when forced outward, extend beneath the bars 11 of butter to thereby support them. At their inner end they are provided with a pin 18, which projects downward and engages with a cam groove 20 formed in the fixed platform 2. The shape of this cam groove 20 is shown in dotted lines in Fig. 2. This is circular, excepting as it approaches the point where the butter is to be cut it bends inward, from which it follows that the butter supporting plates 17 are drawn inward as they reach this point until they no longer act to support the butter. The butter is then supported upon a plate 25, which is carried by a threaded stem 26 from an arm 27, which arm is carried by the reciprocating member which also carries the cutting knife 21. These parts are clearly shown in Figs. 3, 4 and 6.

The cutting knife 21 is supported by and guided in a channel formed by the flange side pieces 22. This flange is stopped at its outer end by a block or section 23, against which the end of the knife contacts at its outer edges whereby the outward movement of the knife is stopped.

The knife together with the arms 27, which carry the butter supporting plate 25, are secured to a stem 24 which is mounted to slide in a hole formed in a lug 28, extending downward from the platform or disk 2. The inner end of the bar 24 is surrounded by a spring 29, which acts against a head formed at the end of the rod to withdraw the cutting knife toward the center of the disk.

A lever 3, which has its inner end forked to form two branches or a yoke 30, is pivoted at 31 to a lug carried by the plate 2, and is connected by means of a cord 32, or an equivalent flexible member, with the reciprocating knife carrying frame. In Fig. 3 these reciprocating parts are shown in their normal or retracted position. If the lever 3 is thrown downward, or into the position shown in Fig. 4, the cord 32 connecting lever 3 with the reciprocating cutting parts, will draw this outward, thereby removing the support 25 from beneath the butter and cutting off a slice, which will drop down and will be caught by an individual butter plate. Upon the release of the arm 3 the spring 29 will retract the butter cutting members and throw the arm 3 upwardly. This withdraws the cutting blade 21 as a support for the butter, and places the support 25 beneath the butter. The bar of butter will then drop until it is supported by the small table 25, and into position for cutting a new slice.

When one of the bars 11 has been used up, the disk 12 is given an intermittent rotative movement, sufficient to bring the next butter holding chamber into registry with the cutting parts and the next bar of butter is cut up. This process is repeated until the bars have all been used up.

The entire device is covered by a bell 19, which is preferably made of glass, as is also the member 1. The use of this material leaves everything within the device visible, and the sanitary qualities are thus made evident. It is also a matter of convenience, as it is quickly seen how much butter is remaining in the device, and arrangements may thus be made for refilling the device before it is entirely empty.

The rotative disk 17 projects a little beyond the member 1 which contains the butter holding chambers, and is preferably provided with holes 18' corresponding in number and location with the butter receiving chambers. A lever 4 is pivoted beneath this plate, preferably at or close to the center thereof, and extends outward to project slightly beyond the face of the device. This lever is provided with an upwardly extending pin 40, which is adapted to enter the hole 18' in the disk. The lever 4 has a sufficient amount of vertical movement or spring so that it may be engaged and disengaged with the holes 18' in the disk. To rotate the device the lever 4 is depressed sufficiently to disengage the pin 40, pushed backward to position to engage the next hole, permitted to rise to engage this hole and then advanced another step.

The fixed platform plate 2 is provided with a slot 41, permitting the passage of the pin 40 and serving as a stop to limit the movement of the lever 4 in both directions.

The device is preferably supported upon legs as 28', which raise it enough to permit convenient insertion of butter dishes or any other suitable dishes, beneath the device to receive the butter.

By using this device the butter may be cut and placed upon the individual butter dishes as needed, and without necessity of touching it with the hands; also the butter is kept at all times under cover, where it cannot get dirty, and is in sight so that it may be inspected, and the sanitary condition of the butter and the handling thereof is readily evident.

It also forms a very convenient method of handling butter, and of keeping the same cool.

What I claim as my invention is:

1. A butter serving device comprising a member having a series of butter-bar-holding cells opening downwardly, means for supporting said member for rotation, movable butter supporting plates for each cell, and means for withdrawing and replacing said plates in succession at a predetermined point in the path of rotation.

2. A butter serving device comprising a member having a series of butter-bar-holding cells opening downwardly, means for supporting said member for rotation, individual movable butter supporting plates for each cell, a stationary cam adapted to control the position of said plates, and cam-engaging means carried by each plate.

3. A butter serving device comprising a member having a series of butter-bar-holding cells opening downward, means for supporting said member for rotation, movable butter supporting plates for each cell, means for withdrawing and replacing said plates in succession at a predetermined point in the path of rotation, and a support positioned to receive the bar of butter when said plate is withdrawn.

4. A butter serving device comprising a member having a series of butter-bar-holding cells opening downward, means for supporting said member for rotation, movable butter supporting plates for each cell, means for withdrawing and replacing said plates in succession at a predetermined point in the path of rotation, and a support below said member and positioned to receive the bar of butter when said plate is withdrawn, said support having means for vertical adjustment.

5. A butter serving device comprising a member having a series of butter-bar-holding cells opening downward, means for supporting said member for rotation, movable butter supporting plates carried by said cell-containing member below each cell, means for withdrawing and replacing said plates beneath their respective cells in succession at a predetermined point in the path of rotation, and means operative at said predetermined points for cutting said bar into individual portions and successively and separately delivering each of said portions.

6. In a butter cutter, a plate normally supporting a bar of butter, means for withdrawing said plate to permit the extrusion of the butter, a movable member carrying a support for the bar of butter, and a knife, and means for actuating said member.

7. In a butter cutter, movable means for supporting a bar of butter from beneath, a knife adjacent the bar of butter and movable with said supporting means, and means for operating said knife and at the same time removing the support from beneath the butter.

8. In a butter cutter, a reciprocable knife, a pivoted arm, flexible operating members secured to said knife, and secured to said pivoted arm beyond the pivot, and fixed guides for said flexible members beyond the pivot from the knife.

9. In a butter cutter, a reciprocable knife, a pivoted arm, flexible operating members secured to said knife, and secured to said pivoted arm beyond the pivot, and fixed guides for said flexible members, beyond the pivot from the knife, and means for automatically returning said knife to its normal position.

10. A butter serving device comprising a foundation plate, a turntable disk journaled thereon, a bowl shaped container for the reception of ice seated upon the turntable disk and having butter-bar-receiving cells in its outer walls opening freely downward, individual butter supporting plates for each cell, movable to permit dropping of the bars of butter, a stationary cam controlling the position of said butter supporting plates, and a fixedly positioned cutting blade mounted for manual movement.

11. In a butter cutter, in combination, a rotative butter containing member having a series of chambers adapted to each hold a bar of butter, said chambers being open at the bottom to permit discharge of the butter by gravity, supporting members movable with said rotative member and normally placed to support the butter, means actuated by the rotation of said containing member to withdraw said supporting members as they reach a fixed position, and a reciprocable knife adapted to remove a portion from the bottom of the bar of butter.

12. A butter cutter comprising a rotative member having a series of butter-bar-holding cells, a reciprocable support below the bar of butter which is being cut, said support being mounted to move from beneath the butter during the cutting operation to leave the lower portion of the bar unsupported, a reciprocable knife movable across the ends of said cells, said knife forming a temporary support for the butter above its lower end during the cutting operation.

13. A butter cutter comprising a member having a series of vertically extending cells adapted to receive bars of butter, movable plates normally serving as bottoms for said cells, means for withdrawing said plates at a predetermined point, and a reciprocable member carrying a knife and a butter supporting table offset from each other, both lengthwise and transversely of the axis of said cells.

14. A butter cutter comprising a member having a series of vertically extending cells adapted to receive bars of butter, movable plates normally serving as bottoms for said cells, means for withdrawing said plates at a predetermined point, and a reciprocable member carrying a knife and a butter supporting table offset from each other, both lengthwise and transversely of the axis of said cells, said butter supporting table being mounted for adjustment relative to said knife lengthwise the axis of said cells.

Signed at Seattle, Washington, this 16th day of February 1916.

JOE E. HOWARD.